United States Patent [19]

Duthie

[11] Patent Number: 4,818,050
[45] Date of Patent: Apr. 4, 1989

[54] OPTICAL SWITCH ARRAYS

[75] Inventor: Peter J. Duthie, Northampton, Great Britain

[73] Assignee: Plessey Overseas Limited, Ilford, England

[21] Appl. No.: 114,906

[22] Filed: Oct. 29, 1987

[30] Foreign Application Priority Data

Nov. 1, 1986 [GB] United Kingdom ............... 8626152

[51] Int. Cl.$^4$ .......................... G02B 6/10; G02B 6/26
[52] U.S. Cl. ................. 350/96.14; 350/96.12; 350/96.15
[58] Field of Search ............. 350/96.11, 96.12, 96.13, 350/96.14, 96.15

[56] References Cited

U.S. PATENT DOCUMENTS

| 4,070,094 | 1/1978 | Martin | 350/96.14 |
| 4,146,297 | 3/1979 | Alferness et al. | 350/96.14 |
| 4,223,977 | 9/1980 | Papuchon et al. | 350/96.12 X |
| 4,262,992 | 4/1980 | Berthold, III | 350/96.13 X |
| 4,381,138 | 4/1983 | Buhl | 350/96.12 X |
| 4,618,210 | 10/1986 | Kondo | 350/96.14 |
| 4,717,228 | 1/1988 | Thylen | 350/96.11 X |

FOREIGN PATENT DOCUMENTS 2558271  7/1985  France .

OTHER PUBLICATIONS

Integrated and Guided-Wave Optics Technical Digest, Atlanta, Ga., Feb. 26-28th, 1986, pp. 46-48: J. L. Jackel et al: "FAA3 Nonsymmetric Mach-Zehnder Interferameters Used As Low-Drive Voltage Modulators", *Whole Article*.
Electronics Letters, vol. 22, No. 15, Jul. 17th, 1986, pp. 816-818, Stevenage, Herts, GB; P. Granestrand et al: "Strictly Nonblocking 8×8 Integrated Optical Switch Matrix", *p. 817, col. 1, lines 1-17, FIG. 1*.
Appl. Phys. Lett., vol. 35, No. 2, Jul. 15th, 1979, pp. 145-147, American Institute of Physics: O. Mikami et al: "Modified Balanced-Bridge Switch With Two Straight Wavelengths", *FIG. 1*.
Appl. Phys. Lett., vol. 35, No. 1, Jul. 1st, 1979, pp. 40-42, American Institute of Physics; M. Minakata: "Efficient LiNo03 Balanced Bridge Modulator/Switch With An Ion-Etched Slot", *FIG. 1*.
Electronics Letters, vol. 20, No. 19, Sep. 13, 1984, pp. 790-792, Staines, Middlesex, GB: M. Fujiwara et al., "Gigahertz-Bandwidth InGaAsP/InP Optical Modulators/Switches With Double Hereto Waveguides", p. 790, col. 2, 11, 15-28*.

Primary Examiner—William L. Sikes
Assistant Examiner—Akm E. Ullah
Attorney, Agent, or Firm—Michael F. Oglo; Julian C. Renfro

[57] ABSTRACT

An optical switch array comprises a plurality of optical switches of the kind utilizing the interaction between light propagating along one of two waveguide path sections in close proximity to one another and an electrical field produced by electric switching voltages applied between electrodes actively associated with the waveguide path sections in order to effect switching of the light from one of the waveguide path sections to the other. The waveguide path sections which provide links between the optical switches of the array and which require electrical isolation from one another have dissimilar physical or other characteristics in order to prevent coupling therebetween in the presence of a nearby electric field.

5 Claims, 3 Drawing Sheets

OPTICAL SWITCH ARRAYS

BACKGROUND OF INVENTION

This invention relates to optical switch arrays comprising a plurality of optical switches of the kind utilising the interaction between light propagating along one of two waveguide path sections in close proximity to one another and an electrical field produced by electric switching voltages applied between electrodes actively associated with the waveguide path sections in order to effect switching of the light from one of the waveguide path sections to the other.

The waveguide path sections of the switches may, for example, comprise sections of waveguide channels or stripes of titanium diffused into the surface of a lithium niobate substrate in close proximity to one another with a pair of electrodes being formed on the surface of the substrate closely adjacent to the diffused waveguide channels with the interposition of insulating material between the electrodes and the substrate surface. The optical switches may, alternatively, comprise a substrate of gallium arsenide, indium phosphide or other III-V material in which a so-called Schotkky layer is provided between electrodes and the substrate instead of waveguide channels being diffused into the substrate.

Whatever the particular form of optical switch is employed the flux lines of the electric field cut through the closely adjacent waveguide path sections in order to effect switching of light from one waveguide path section to another.

For the purpose of providing an array of such optical switches to facilitate complex optical switch routing arrangements it has hitherto been the practice to form the switches of the optical array on the same substrate but to electrically isolate the respective switches from one another by sufficient spatial separation between switches. Due to space considerations this technique has necessitated the provision of relatively sharp bends in waveguide sections linking the closely adjacent waveguide path sections of the optical switches. These waveguide section bends are lossy and occupy valuable substrate space. Another known technique for providing the requisite optical switch isolation resides in the provision of extremely narrow milled slots in the optical array substrate at positions between those waveguide sections which link the switches and which need to be electrically isolated from one another. However, the milling of such slots needs to be formed with precision and renders this technique unduly costly and time comsuming especially in volume production of optical switch arrays.

SUMMARY OF THE INVENTION

According to the present invention there is provided an optical switch array having optical switches of the kind described above in which closely adjacent waveguide path sections which provide links between optical switches of the array and which require electrical isolation from one another have dissimilar physical or other characteristics in order to prevent coupling therebetween in the presence of a nearby electric field.

The dissimilarity between the effectively decoupled waveguide path sections may result from different refractive indexes which may be achieved in the case of titanium/lithium niobate devices by varying the width or depth of the diffused titanium waveguide channels in the lithium niobate substrate.

Thus in carrying out the present invention a plurality of waveguide channels extending in parallel across the common substrate of the switch array may have alternate portions thereof of different characteristics which couple only with portions of like characteristics in adjacent waveguides having the same characteristics throughout their lengths.

BRIEF DESCRIPTION OF THE DRAWINGS

By way of example the present invention will now be described with reference to the accompanying drawings in which.

DETAILED DESCRIPTION

Figure 1:
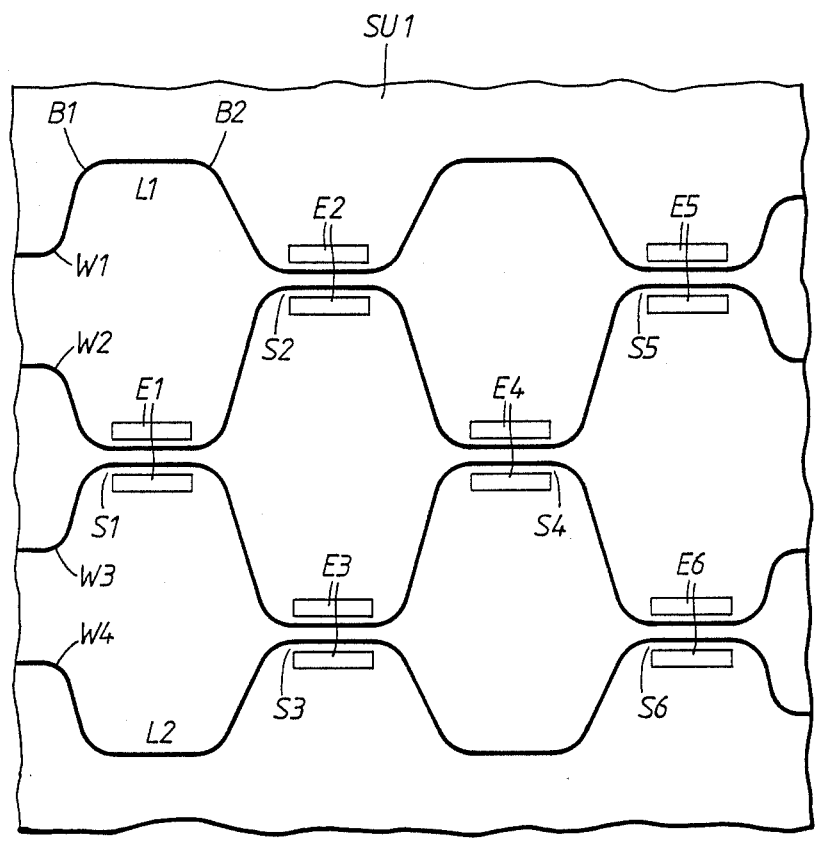
FIG. 1 shows one known construction of optical switch array.

Referring to FIG. 1 of the drawings, there is shown an optical switch array comprising waveguide channels or paths W1 to W4 provided on a common substrate SU1. At each of the switch locations S1 to S6 the waveguide channels or paths have sections which are positioned closely adjacent one another and extend between pairs of electrodes E1 to E6. As previously mentioned, the waveguide channels W1 to W4 may comprise thermally diffused titanium in a lithium niobate substrate SU1 or the substrate may be of gallium arsenide and provided with a Schottky layer.

In operation of such optical switch arrays, switching voltages will be applied between the electrodes of selected pairs of electrodes E1 to E6 in order to produce electric fields which interact with light propagating along one or more of the waveguide channels or paths W1 to W4 so as to produce effective coupling between the adjacent waveguide channel or path sections at the switch positions S1 to S6 whereby light will be transferred from one waveguide channel to another at such switching positions. In order positively to prevent coupling between the waveguide channels at the non-switch positions the waveguide channels are of looped form such as indicated by the loops L1 and L2 in the drawing. However, the relatively sharp bends such as indicated at B1 and B2 in the case of loop L1 give rise to relatively high optical losses and, moreover, the loops increase substantially the total area of substrate SU1 required to accommodate the switch array.

Figure 2:
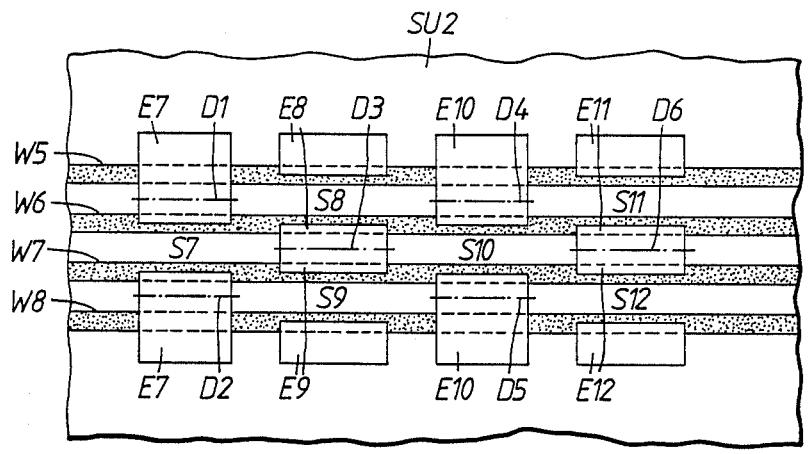
FIG. 2 shows another form of known optical switch array.

Referring now to FIG. 2 of the drawings, this shows an alternative known optical switch array of the same general kind as FIG. 1, except that the waveguide paths or channels W5 to W8 having associated electrode pairs E7 to E12 are straight and parallel to one another. In this embodiment the need for the waveguide channel loops shown in FIG. 1 in order to afford electrical isolation is avoided by milling slots D1 to D6 in the substrate SU2 at positions between the waveguide channels, as indicated, so as to decouple the waveguide channels from one another except at the switch positions S7 to S12. As can be appreciated the precision milling of extremely narrow slots in the spaces between the waveguide channels of these minute switching array devices is both time-consuming and costly.

Figure 3:
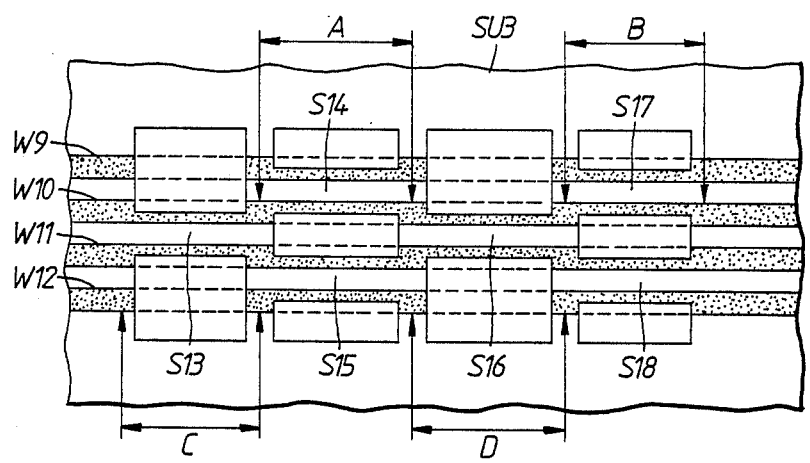
FIG. 3 shows an optical switch array constructed in accordance with the present invention.

Referring now to FIG. 3 of the drawings, this shows an optical switch array constructed in accordance with the present invention. As in the case of the FIG. 2 known arrangement described above the waveguide channels W9 to W12 are straight and parallel relative to one another so that the loops and sharp bends of the FIG. 1 construction and the consequential losses are avoided. Moreover, the need for the costly milling of decoupling slots in the substrate as described with reference to FIG. 2 is avoided by decoupling the waveguide channels W9 to W12 except at the switch locations S13 to S18 by imparting different characteristics to those parts of the waveguide channels where decoupling is required. In the present embodiment the waveguide channels W9 and W11 have different characteristics from one another throughout their entire lengths. The waveguide channel W10 has sections A and B thereof with the same characteristics as the waveguide channel W9 and channel W12 has sections C and D with the same characteristics as channel W9. All the other sections of waveguides W10 and W12 have characteristics the same as channel W11. This pattern of waveguide channel characteristics and the positioning of the pairs of electrodes E13 to E18 provide switch positions S13 to S18 as indicated in the Figure.

In order to provide the requisite dissimilarity between the waveguide channels the width or depth of the diffused titanium stripes or channels in the case of titanium/lithium niobate devices may be varied. Alternatively, magnesium could be diffused into the titanium stripes or channels or still further the refractive index of the channels could be modified by varying the dielectricl layer which is interposed between the electrodes and the substrate.

I claim:

1. An optical switch array comprising a plurality of optical waveguide paths which extend in parallel and in close proximity with one another across a common substrate, a plurality of optical switches comprising opposed sections of adjacent waveguide paths having electrodes actively associated therewith between which electrical switching voltages are applied to effect switching of light from one waveguide path to another, in which some of the optical waveguide paths have the same characteristics throughout their lengths whereas the other optical waveguide paths have alternate sections thereof of dissimilar characteristics whereby the said opposed sections of adjacent waveguide paths forming parts of the optical switches are of the same characteristics to facilitate effective coupling between these waveguide paths when electric switching signals are applied to the electrodes and whereby further opposed sections of adjacent waveguide paths extending between the optical switches have dissimilar characteristics to prevent coupling therebetween in the presence of the electric field produced in nearby optical switches.

2. An optical switch array as claimed in claim 1, in which the dissimilar characteristics of the effectively decoupled waveguide path sections result from different refractive indexes.

3. An optical switch array as claimed in claim 2, in which the waveguide paths comprise channels or stripes of titanium diffused into the surface of a lithium niobate substrate with a pair of electrodes being formed on the surface of the substrate closely adjacent to opposed sections of the diffused waveguide channels with the interposition of insulating material between the electrodes and the substrate surface.

4. An optical switch array as claimed in claim 2, in which the common substrate for the optical switches comprises gallium arsenide, indium phosphide or other III-V material in which a Schotkky layer is provided between electrodes and the substrate.

5. An optical switch array as claimed in claim 3, in which the different refractive indexes are achieved by varying the width or depth of the diffused titanium waveguide channels in the lithium niobate substrate.

* * * * *